United States Patent [19]

Downer

[11] 4,111,678

[45] Sep. 5, 1978

[54] FOLIAR FEEDING ORGANOMETALLIC COMPOSITION

[75] Inventor: John D. Downer, Trinidad, Trinidad and Tobago

[73] Assignee: Texaco Trinidad Inc., Pointe-a-Pierre, Trinidad and Tobago

[21] Appl. No.: 776,344

[22] Filed: Mar. 10, 1977

[51] Int. Cl.$^2$ ............................................. C05F 11/00
[52] U.S. Cl. ................................... 71/27; 71/DIG. 2; 424/356; 252/38; 260/429 J; 260/429.9; 260/438.1; 260/439 R
[58] Field of Search ................. 71/1, 11, 27, DIG. 2; 260/514 N; 424/287, 288, 356; 252/38

[56] References Cited

U.S. PATENT DOCUMENTS

| | | | |
|---|---|---|---|
| 2,865,956 | 12/1958 | Ellis | 260/514 N X |
| 3,661,550 | 5/1972 | Downer et al. | 71/27 |

*Primary Examiner*—Ferris H. Lander
*Attorney, Agent, or Firm*—Thomas H. Whaley; Carl G. Ries; Henry W. Archer

[57] ABSTRACT

Disclosed is a foliar feeding spray composition for supplying trace metals to plants comprising a thermally-treated trace metal chelate dissolved in a hydrocarbon mineral oil carrier having a minimum gravity API of 27, a viscosity at 100° F. of between 55 and 100 Saybolt Universal Seconds, a boiling point range of between about 600° F. and 775° F. and a minimum unsulphonated residue content of 85%, the thermally-treated chelates being present in an amount ranging from 0.05 to 12.0 percent basis oil.

5 Claims, No Drawings

FOLIAR FEEDING ORGANOMETALLIC COMPOSITION

BACKGROUND OF THE INVENTION

1. Field of the Invention

This invention relates generally to oil soluble organometallic compounds and to their use as micronutrients in spray oils.

2. Description of the Prior Art

Certain elements, known as micronutrients or trace elements, B, Mo, Mn, Fe and Zn are known to be essential for plant growth. Where the soil is deficient in some trace elements it is necessary to supply them if efficient cultivation is desired. Normally this is done by addition of metal salts to the soil. The technique of applying trace elements through the leaves by means of carrier oils, is much less wasteful since the spray oil is applied directly to the leaf and the oil is more resistant to weathering. Moreover, in the case of an oil solution, absorption through the plant leaf via the wax canals should be enhanced considerably. However, various prior art spray oil solutions of trace salts have proven phytotoxic at practical levels of application. For example, oil soluble zinc and manganese salts of low molecular weight naphthenic acids are relatively phytotoxic at practical application dosages, believed due at least in part to the formation of free naphthenic acids on the leaf surface.

SUMMARY OF THE INVENTION

It has been discovered in accordance with the present invention that spray oil compositions containing from 0.05 to 12.0 percent of a thermally rearranged trace metal chelate, as hereafter described, are effective in relieving the leaf deficiency symptoms, increasing the tissue metal concentration of the deficient element in various plants, in particular in citrus plants, and are relatively non-phytotoxic.

The use of metal chelates as agricultural nutrients is already known but, to our knowledge, an oil soluble composition prepared from trace metal chelates for foliar application has not been disclosed previously. It is well known that $\beta$-ketoesters of the general formula $R_1C(O)CHR_2C(O)OR_3$, where $R_1$ and $R_3$ are alkyl, cycloalkyl, aralkyl, aryl, alkaryl and $R_2$ is hydrogen or alkyl, form chelate salts with various metals. Esters of acetoacetic acid are especially well known in this regard. However these chelates possess limited solubility in hydrocarbon oils even when the $\beta$-ketoester contains a relatively long alkyl substituent, e.g. octylacetoacetate. This limitation is overcome by a thermal rearrangement of the chelate according to the art disclosed in U.S. Pat. No. 2,926,184, the initial crystalline chelate changing to an oil soluble liquid the structure of which is unknown. The thermal treatment causes the chelates to undergo a permanent molecular rearrangement with no loss or gain in weight. The thermally rearranged trace metal chelates of the present invention can be made by the method of U.S. Pat. No. 2,926,184.

The spray oil used is a non-phytotoxic hydrocarbon oil having a minimum gravity API of 27, a viscosity at 100° F. of between 55 and 100 Saybolt Universal Seconds, a boiling point range between about 600° and 775° F. and minimum unsulphonated residue content of 85 percent. A lighter oil with API gravity around 50 and boiling range 85-600° F, belonging to the general groups of paraffins, isoparaffins and/or naphthenes was found best for use with light weight ultra low volume sprays. An analysis of a preferred oil is given in Table I below:

TABLE I
ANALYSIS OF PREFERRED CARRIER OIL

| Sample No. | RS-1200/67 |
| --- | --- |
| Sp. Gravity at 60° F (ASTM D-1298) | 0.8493 |
| ° PI Gravity (ASTM D-1250) | 35.1 |
| Flash Point, (COC), ° F (ASTM D-92) | 395 |
| Viscosity SUS/100° F (ASTM D-445/2161) | 84.2 |
| Colour (ASTM D-1500) | <0.5 |
| Pour Point, ° F (ASTM D-97) | 5 |
| Neutralization No. mg. KOH/g. | 0.04 |
| Distillation, ° F (ASTM D-447) | |
| IBP | 637 |
| 10% | 675 |
| 50% | 696 |
| 90% | 729 |
| FBP | 745 |
| Ash, % wt. | 0.001 |
| Unsulphonatable Residue, vol. % (ASTM D-483) | 94.2 |

DESCRIPTION OF PREFERRED EMBODIMENTS

The following explanatory data and examples illustrate the preparation of chelates suitable for the practise of the invention and their specific and novel utility as micronutrients in certain horticultural spray oils. It will be understood, however, that it is not intended to limit the invention to the features particularly exemplified hereinbelow.

EXAMPLE I

Octylacetoacetate (20 g.) was mixed with a solution of sodium hydroxide (4 g.) in wter (100 ml.) and the mixture added to a stirred solution of anhydrous zinc chloride (6.4 g.) in water (150 ml.). The resulting heavy white precipitate was filtered, washed with distilled water until free of chloride ion, and dried overnight in vacuo over phosphoric oxide. The crude solid product was heated in vacuum to 150° C. and the deep orange slurry obtained was cooled and extracted with benzene. The extract was stripped of benzene to give "rearranged" zinc bis-octylacetoacetate (10.3 g.).

EXAMPLE II

Octylacetoacetate (25 g.) was mixed with a solution of sodium hydroxide (5 g.) in water (125 ml.) and the mixture added to a stirred solution of manganous chloride tetrahydrate (12 g.) in water (165 ml.) under a nitrogen atmosphere. The resulting slurry was extracted with benzene, the extract stripped of benzene and the residue heated in vacuum to 130° C., avoiding all contact with air by use of nitrogen, to give "rearranged" manganese bis-octylacetoacetate (16 g.): Found, Mn 11.6%; theor. Mn 11.4% w/w.

A comparative phytotoxicity trial was made with spray oil solutions of the thermally treated zinc bis-octylacetocetate and neutral zinc naphthenates made from low molecular weight naphthenic acids of acid value 236 mg. KOH/g. Clusters of approximately 40 leaves on the leeward side of Valencia orange trees were sprayed with these materials on the upper surfaces of the leaves using an aerosol dispenser. Leaves were 5-7 months old and either all-fruiting terminal or all non-fruiting terminal. A relatively severe dosage was applied of between 11-13 gal/acre at 0.4% w/v metal content. Spraying was done in the morning between 0800 and 0900 hours. Daily observations at 0800 hours and weather conditions for the following two weeks are summarized in Table II. Spraying included carrier oil (Table I) alone and untreated clusters labelled for identification. It will be seen that no leaf burn resulted from the application of the thermally treated zinc bis-octylacetoacetate.

Similarly a solution of spray oil containing the "rearranged" manganese bis-octylacetoacetate (1% wt. Mn) showed no leaf burn effect and no "leaf drop" after one week when sprayed onto the leaves of grapefruit.

TABLE II

Phytotoxicity of Spray Application on Valencia Orange Trees[a]

| Applications | Level of Spray | Observations Severity[b] (1) (%) | (2) (%) | Leaf drop (%) |
|---|---|---|---|---|
| Carrier Oil | 18 | 100 | None | None |
| Neutral Zn Naphthenate | 12 | 83 | 5 | 12 |
| Zn bis-octylacetoacetate | 13 | 100 | None | None |

[a]Observations reported, 14 days after spraying.
Average weather conditions:
Maximum temperature, 90° F
Minimum temperature, 76° F
Rainfall 0.16 in.
[b]Severity Code:
(1) Represent Normal Leaves
(2) Represent Localised Burns.

Greenhouse trials with corn seedlings were conducted to demonstrate foliar uptake and assimilation of these oil soluble micronutrients. A constant level water culture technique[a] was adapted with each culture unit consisting of a reservoir (10-15 l. capacity) supplying nutrient solution to 4 or 6 glass vessels each of about 800 mls. capacity. Each vessel carried a maximum of 4 seedlings. The solution in the growth vessels was left constantly aerated. The macronutrient formula of Arnon and Hoagland[a] and that of Arnon[a] for the micronutrients were used for the culture solutions prepared from deionized steam condensate and high purity compounds (Analar reagents). Only the micronutrient being sprayed was excluded from the water culture. The manganese and zinc compounds were applied in the oil carrier (Table I) at the concentration of 0.02% w/v metal. The seedlings were treated, 2 ml. oil solution per two seedlings, at 7 days after transplanting the seedling to the growth vessel. The seedlings were allowed to grow for about 21 to 31 days after which time dry tissue weights were determined. It will be seen from Table III that there were positive responses, particularly with root growth, to the oil sprays of the thermally treated zinc and manganese bis-octylacetoacetates.

a - E. J. Hewitt's "Sand and Water Culture Methods", Tech. Commun., No. 22 (Revised 2nd Edn.), C.A.B. Englnd, 1966, p. 471, 472 and 490.

Similar trials were carried out with tomato seedlings with the thermally treated zinc and manganese bis-octylacetoacetates but carried in alkylate bottoms, a light nonphytotoxic aliphate hydrocarbon mixture. The tomato seedling growth in aqueous culture solution from which these elements were excluded exhibited typical zinc and manganese deficiency symptoms (mottled leaf) which were absent in the seedlings sprayed with the trace element oil solutions.

In general the subject spray compositions are applied at the rate of about 0.5 to about 20 gallons per acre with a low volume knapsack sprayer. A droplet size suitable for most spray applications is about 80 microns but this size can be within the range of about 50 to about 100 microns. A density suitable for most applications is one of about 32 droplets per sq. cm. Spraying is preferably done early in the wet season and when the weather is calm to minimize drifting of the spray.

TABLE III

Mean Treatment Effects of Zinc and Manganese Bis-octylacetoacetates Grown in Water Culture

| Element excluded from Culture Solution | Dry Tissue weight g. Unsprayed | Sprayed | % Increase in wt. |
|---|---|---|---|
| | Foliage | | |
| Zn | 4.8 | 5.1 | 106 |
| Mn | 3.1 | 3.5 | 113 |
| | Root | | |
| Zn | 1.2 | 1.9 | 158 |
| Mn | 0.7 | 1.1 | 157 |

What is claimed is:

1. A foliar feeding spray composition for supplying trace metals to plants comprising a non-phytotoxic hydrocarbon mineral oil carrier having a minimum gravity API of 27, a viscosity at 100° F of between 55 and 100 Saybolt Universal Seconds, a boiling range between 600° F and 755° F and a minimum unsulphonated residue content of 85%; and an oil soluble organometallic compound made by thermal rearrangement of a chelate having the general formula $[R_1C(O)\ CHR_2C(O)\ OR_3]_2M$, where $R_1$ and $R_3$ are radicals containing up to about 10 carbon atoms each and are selected from the group consisting of alkyl, cycloalkyl, aralkyl, aryl and alkaryl radicals, $R_2$ is selected from the group consisting of hydrogen and alkyl radicals containing up to 10 carbon atoms and M is zinc, copper, iron, manganese or molybedenum; said organometallic compound being present in said oil at a concentration of between about 0.05 and 12.0 percent basis volume of said oil.

2. The composition of claim 1 wherein said metal chelate is zinc bis-octylacetoacetate.

3. The composition of claim 1 wherein said chelate is manganese bis-octylacetoacetate.

4. The process for supplying plants with trace metals comprising spraying the leaves, branches or barks of said plants with from about 0.5 to about 20 gallons per acre of the composition of claim 1.

5. The composition of claim 1, wherein said mineral oil has a boiling range between 85°-600° F, and is selected from group of praffins, isoparaffins, naphthenes and mixtures thereof.

* * * * *